Jan. 2, 1945. C. P. GRIFFITH ET AL 2,366,330
THERMOSTATIC ADJUSTMENT FOR METER CALIBRATING MECHANISM
Filed Aug. 10, 1940 2 Sheets-Sheet 2
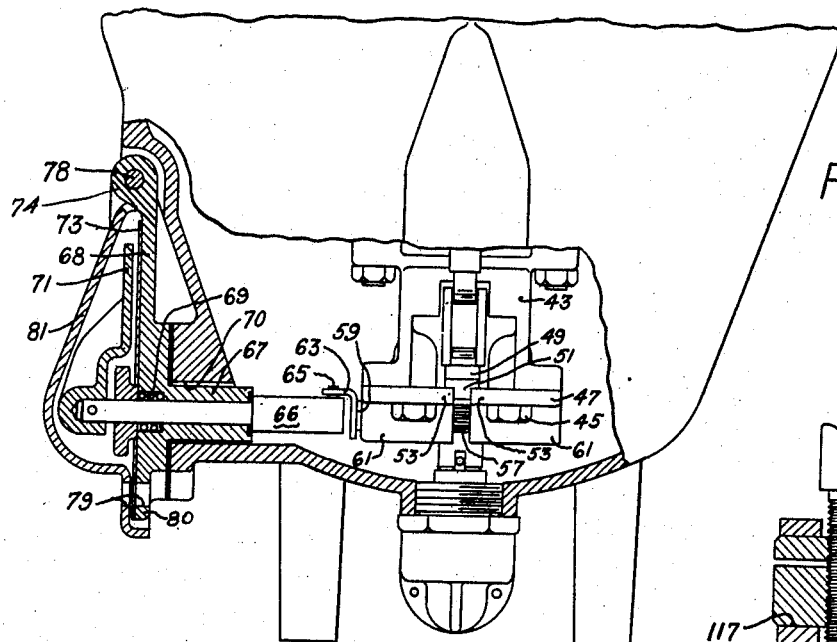
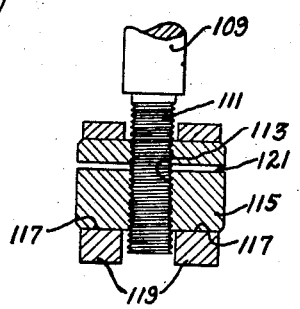
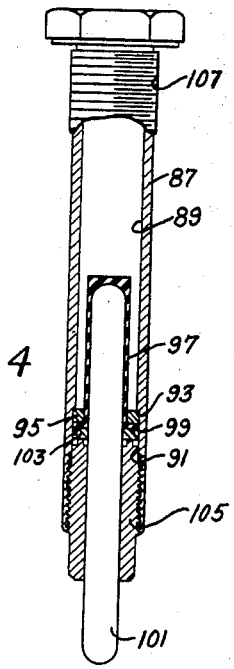
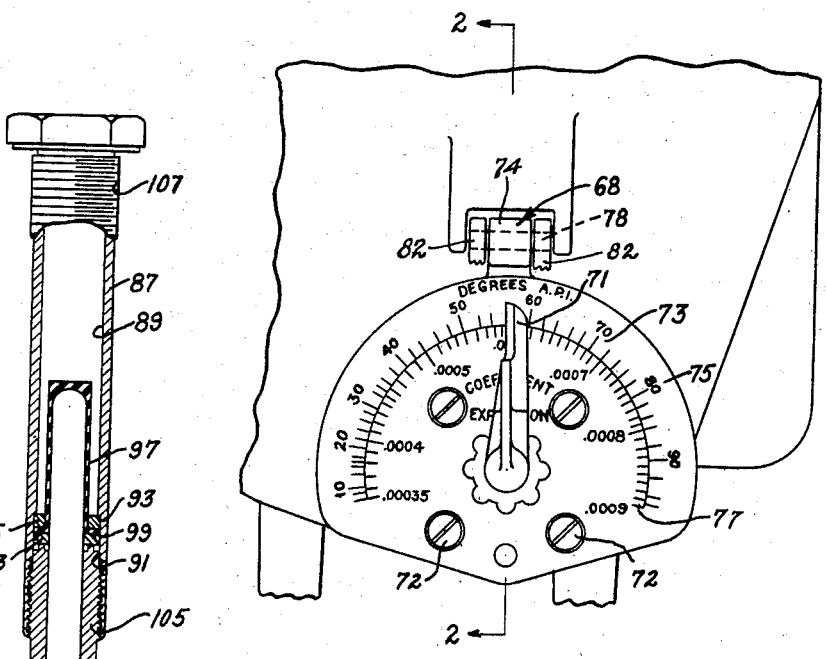
Clement P. Griffith
John J. Delaney.
INVENTORS
BY Edmund W. E. Kamm
ATTORNEY.

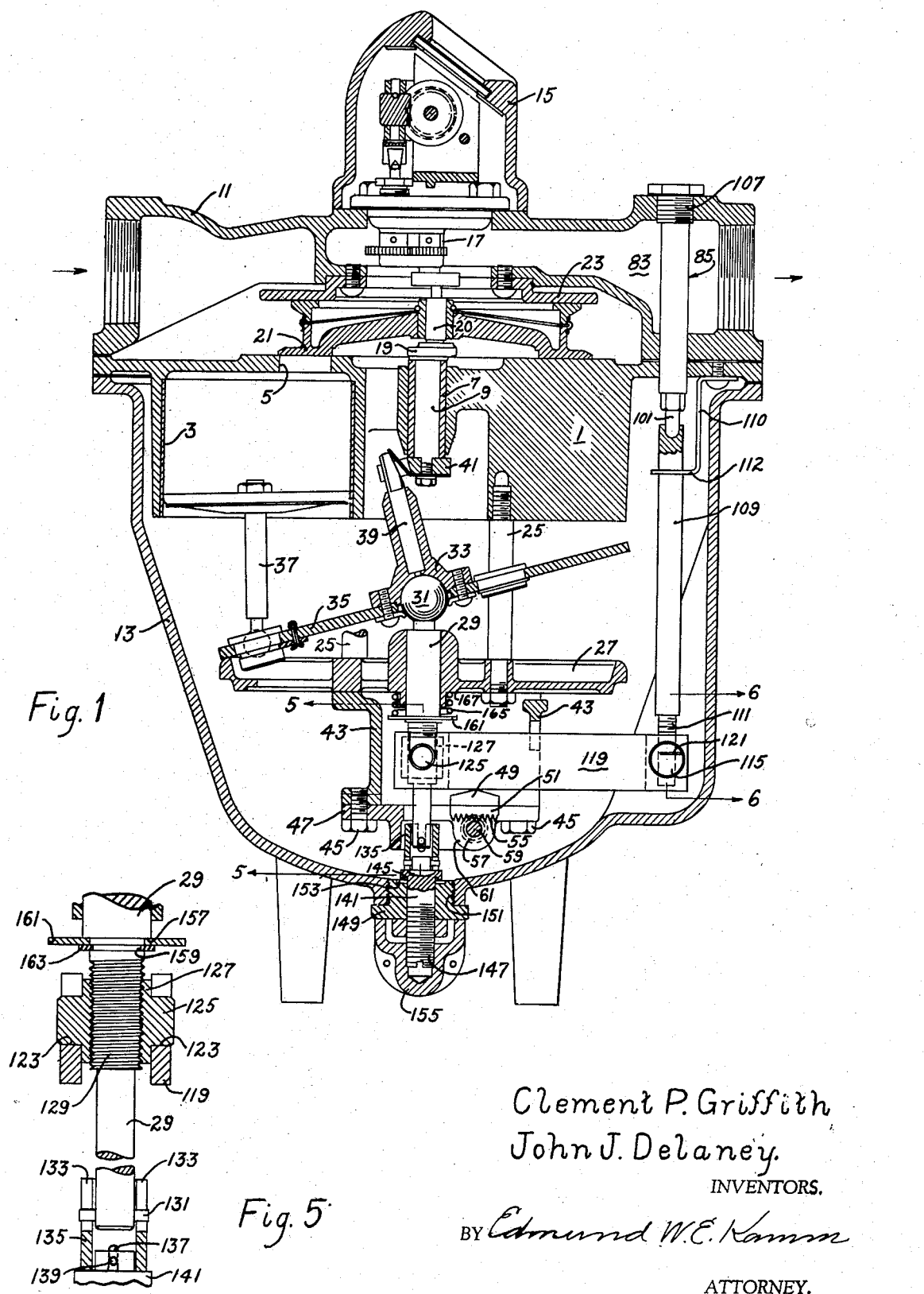

Patented Jan. 2, 1945

2,366,330

UNITED STATES PATENT OFFICE 2,366,330

THERMOSTATIC ADJUSTMENT FOR METER CALIBRATING MECHANISM

Clement P. Griffith and John J. Delaney, Fort Wayne, Ind., assignors to S. F. Bowser & Company, Incorporated, Fort Wayne, Ind., a corporation of Indiana Application August 10, 1940, Serial No. 352,136

8 Claims. (Cl. 73—244)

This invention relates to means for adjusting the discharge capacity of a meter so as to correct for the increased or decreased unit volume of liquid discharged with respect to the unit volume of liquid at a standard temperature.

The invention contemplates the adjustment of volume of discharge to correct for both the temperature and the coefficient of expansion of the liquid being handled.

It is a further object of the invention to produce a temperature compensating meter which is small and compact.

These and other objects will become apparent from a study of this specification and the drawings which are attached hereto and form a part hereof and in which:

Figure 1 is a vertical, partly sectional view of a meter showing the measuring and temperature compensating mechanism.

Figure 2 is a sectional view taken on the line 2—2 of Figure 3 showing the adjustment for the coefficient of expansion.

Figure 3 is a partial elevation of the coefficient of expansion indicator as viewed from the left of Figure 2.

Figure 4 is a sectional view of the thermostatic element showing the plunger and the liquid seal.

Figure 5 is a section taken on the line 5—5 of Figure 1 showing details of the adjusting screw mounting.

Figure 6 is a section taken on the line 6—6 of Figure 1 showing the details of the coupling between the fulcrum bar and the thermostat thrust rod.

A divisional application Serial Number 420,634 was filed on November 27, 1941, covering per se, the thermostatic element disclosed herein.

Referring to Figure 1, the numeral 1 indicates the meter block in which are formed cylinders 3 provided with ports 5 and a crank bearing 7 in which operates the crank shaft 9.

A meter head 11 and a bowl 13 are joined to the block by suitable fastenings not shown and the head carries a register 15 which is driven by the gearing 17.

The shaft 9 carries a crank 19 and crank pin 20 on which is mounted a valve 21 which controls the ports 5 and which bears against a sealing ring 23 mounted on the head 11. The crank pin serves to actuate the gearing 17 in a well known manner.

Studs 25 in the block suspend at a predetermined distance from the block, a track 27. Mounted for movement axially of the track is a shaft 29 which carries a spherical journal 31.

The mechanism for adjusting the shaft will be described below.

Mounted on journal 31 is a bearing 33 which carries a control plate 35 which, in turn, is adapted to roll with its outer and lower peripheral surface on the track 27. The pistons 37 are fixed at spaced points in the plate 35 and reciprocate in the cylinders to drive the plate with a nutatory motion.

A shaft 39 projects axially from said bearing and drives a crank 41 which is fixed to shaft 9 so that the valve will be rotated in time with the control plate.

All of this structure is old in the art and can be found in the patents issued to H. L. Blum, 1,423,597 and 1,977,424.

It will be seen that as the journal 31 is raised with respect to the track 27, the stroke of the pistons will be increased and vice versa so that the volume displaced per revolution of the shaft 9 and of the register 15 will be varied.

If it is desired to dispense a volume of liquid which will occupy a predetermined space at a predetermined standard temperature such as 60 degrees Fahrenheit, which is commonly used, it will be seen that as the temperature of the liquid being handled rises above 60 degrees Fahrenheit, the volume discharged from the meter per revolution will have to be increased and that as the temperature falls below 60 degrees Fahrenheit the volume discharge will have to be decreased.

The expansion or contraction of a liquid is a function of both the coefficient of cubic expansion and also of the temperature change, and both factors are considered and corrected for as closely as possible by means of the mechanism which will now be described.

A hanger 43 depends from the track 27 and has fixed to its lower end by screws 45 a track plate 47 as shown in Figures 1 and 2. A fulcrum element 49 which is T-shaped in cross-section (Figure 2) has its depending rib 51 disposed between the track elements 53 of the track plate and the lower surfaces of the fulcrum portion in sliding engagement with the upper surface of said track elements.

The lower surface of the rib 51 is formed with rack teeth 55 which are adapted to mesh with the teeth of a pinion 57. The latter is fixed to rotate with a shaft 59 which is journalled in bearings 61 formed in the track plate.

One end of the shaft 59 carries a projecting dog 63 which engages by means of an open ended slot, a radially extending pin 65 in a shaft 66 which is mounted to rotate in a bearing 67 in substantially axial alignment with shaft 59.

The bearing 67 forms a part of a bracket 68 and enters an opening 70 in the meter bowl. The bracket is held in place by screws 72 and a gasket is provided to prevent the escape of liquid. A stuffing box 69 is provided to seal off shaft 66 and an indicator 71 is fixed to the shaft and cooperates with the indicator plate 73 which is fixed to the bracket by the screws 72. This plate preferably bears indicia 75 of A. P. I. degrees for use in measuring petroleum products and also coefficients of expansion 77 for use when metering other liquids. The indicator plates can be readily changed if desired so that, for instance, a plate having specific gravities may be used if desired.

The bracket 68 is provided with a boss 74 which carries a hinge pin 76. A door 81 has perforated ears 82 which receive the pin 78 so that the door will swing up and down to cover the indicating mechanism just described. Aligned holes 79 in the door and in a projection 80 on the bracket provide means for the reception of a lock for holding the door closed.

Mounted in the meter head 11, and preferably in the outlet passage 83 thereof, is a thermostat 85. As shown in Figure 4, the thermostat comprises a cylinder 87 having a uniform bore 89 and a threaded counterbore 91 forming a shoulder 93 with the bore.

A holding ring 95 is adapted to fit in the counterbore and to rest on the shoulder 93. An elastic boot or diaphragm 97 made of synthetic rubber or any other elastic material which is resistant to heat and the fluid used in the thermostat, is formed with a rimmed flange 99 and is adapted to pass through the ring into the bore and to have its flange rest on the ring.

A plunger 101 fits snugly in the diaphragm and a clamp ring 103 which closely fits the plunger and which fits snugly in the counterbore is next passed into the counterbore. The ring 103 is formed to fit the rimmed flange portion of the boot and a nut 105 is then screwed into the counterbore to force the ring 103 into clamping relation on the flange of the boot and the boot flange against ring 95 so that the flange seals the structure against the passage of liquid. In forming the holding and clamping rings considerable care must be exercised so that there is no sharp corner or place of excessive pressure between the rings. In addition, the ring 95 must clear the boot sufficiently so that there will be no binding of the boot between this ring and the plunger. The corners of ring 95 adjacent the boot should be rounded.

Referring again to Figure 1, it will be seen that the threaded portion 107 of the element 85 is inserted in an opening in head 11 so that the plunger 101 projects downwardly to contact the push rod 109. A guide bracket 110 is fixed to the meter block 1 and has an ear 112 which is perforated to receive and support the upper end of rod 109 against lateral movement. The lower end 111 of this rod is received in a threaded opening 113 (Figure 6) in a journal plug 115 which is pivotally received in aligned bearings 117 in one end of a fork ended beam 119. The plug 115 is eccentrically slotted as at 121 so that once the adjustment of the threaded end 111 in the plug is effected, one end of the plug can be deformed as by compressing it to close the slot 121 at one corner and this will lock the threaded portions in place to maintain the adjustment. Such deformation will not destoy the value of the plug as a journal since the bearing pressure is applied on the lower, undeformed portion of the plug.

The other forked end of beam 119 is provided with bearings 123 which are open at the top and which receive the trunnions 125 which are formed on the nut 127 (Figure 5).

As shown in Figures 1 and 5, the shaft 29 which carries spherical journal 31 is threaded at 129 to enter the nut 127. The lower end of shaft 29 is provided with a transverse pin 131 which is adapted to enter slots 133 in a coupler 135. The latter device contains slots 137 which receive a pin 139 in the key 141. The key comprises, in addition to pin 139, a beaded flange 145 and a threaded end portion 147 which projects through a plug 149 which enters an opening 151 in the bottom of the meter bowl. The plug supports a disc 153 which coacts with the bead on flange 145 to seal the joint. A seal cap 155 may be screwed on the portion 147 to lock the key in position after adjustment.

The shaft 29 is provided with a shoulder at 157, as shown in Figure 5 particularly, and is provided with a groove 159. A spring seat 161 abuts the shoulder and is held in place by a snap ring 163 which enters the groove 159. A spring 165 is compressed between the seat 167 formed on the track 27 and the seat 161 and urges the bearing 31 downwardly at all times.

*Operation*

In constructing the meter the adjustment of screw 111 in plug 115 is made so that at the standard temperature, which is usually 60 degrees Fahrenheit, the beam 119 will lie substantially parallel to tracks 53 because a unit measure of all liquids should be dispensed per cycle of the meter or register at the standard temperature, regardless of their coefficients of expansion. Accordingly, movement of the fulcrum through its entire range should not effect any movement of journal 31. This condition exists only when the beam and tracks are parallel.

The fulcrum 49 is next moved into contact with the shaft 29 and the indicator 71 is fixed on shaft 66 so that it will indicate lowest expansion coefficient.

In calibrating the meter, the indicator 71 is set to the coefficient of expansion of the liquid being measured, and then the spherical journal is raised or lowered by means of the key 141, coupling 135 and shaft 29 until the meter delivers the right quantity of liquid for the temperature and expansion coefficient of the testing liquid. The key is then locked in place by application of a suitable lock nut and protected by the seal nut 155.

The coefficients of cubic expansion of liquids vary not only with the different liquids but also in different temperature ranges of a given liquid. An operator of the device disclosed herein usually has a thermometer inserted in the flow line to indicate the temperature of the liquid being measured so that by selecting the coefficient of expansion which obtains for the liquid being measured, at that temperature, and by setting indicator 71 on scale 73, an accurate setting of the meter can be obtained. It rarely occurs that the setting will be at a point of rapid change of coefficient so that under usual conditions the thermostat may then be relied upon to adjust very accurately for any reasonable variance in temperature above or below that at which the coefficient was selected.

Even when the coefficient is set at a point of relatively rapid change, the error in adjustment afforded by the meter will be well within commercial tolerances and the delivery will be more nearly accurate than it would be were no adjustment at all made for the coefficient of expansion.

The fluid selected for the thermostat should be one which has a regular coefficient curve, that is, one which does not have sudden and/or large range changes of coefficient. It has been found that pure grain alcohol of 180 proof is a suitable substance for this purpose.

It will be seen from the drawings that the thermostatic liquid is confined in the bore 89 of the thermostat. As the temperature of the liquid being measured decreases or increases, the temperature of the thermostatic liquid follows and as it decreases the liquid assumes less volume so that the pressure of spring 165, the liquid pressure on the piston and the weight of various parts of the meter will force plunger 101 into the cylinder. The boot 97 will stretch as this occurs and will maintain the liquid seal even though the unit pressures in the cylinders are very high. These often reach 180 pounds per square inch in a two inch meter.

As the liquid condenses, due to the falling temperature, the spherical journal 31 is lowered to decrease the liquid discharged by the meter for each cycle.

The position of the fulcrum 49 under the beam 119 modifies the movement of the plunger 101. By movement to the right in Figure 1, the ratio of the portion of bar 119 on the left of the fulcrum to that on the right is increased. That is L/R is increased so that the movement of journal 31 for a given movement of plunger 101 is greater when the fulcrum occupies a right-hand position. Thus the coefficients of cubic expansion on scale 75 must increase in a clockwise direction as shown in Figure 3.

The shaft 29 is supported in the central boss of the track 27 against lateral motion and the trunnions 125 which are carried upon the shaft serve to prevent endwise motion of the beam 119.

Movement of the shaft 29 axially relative to the adjusting key is permitted by the collar 135 and the pin connections thereto. The amount of lost motion provided in this connection exceeds the possible movements of the shaft 29 under working conditions so that the connection between the key and the shaft is always maintained.

After the setting of indicator 71 with respect to the scales 75 or 77 is made, this mechanism can be locked against tampering by applying a lock through the perforations 79 shown in Figure 2.

It should be remembered that the register 15 is in effect merely a revolutions counter which registers the number of revolutions of the displacement mechanism in terms of gallons or cost at the standard temperature. The actual volumetric delivery at any temperature other than the standard will be more or less than that registered depending on whether the temperature is above or below the standard. The amount of overage or underage will depend upon the action of the thermostat as modified by the coefficient of expansion correction mechanism.

It is obvious that various changes may be made in the form, structure and arrangement of parts without departing from the spirit of the invention. Accordingly, applicants do not desire to be limited to the specific embodiment disclosed herein primarily for purposes of illustration; but instead, they desire protection falling fairly within the scope of the appended claims.

What we claim to be new and desire to protect by Letters Patent of the United States is:

1. In a thermostatic meter comprising a case, displacement means in said case, adjusting means for said displacement means in said case, means disposed in the case for setting said adjusting means to correct the liquid discharged in accordance with its cubic expansion coefficient, and means extending outside of said case for actuating said setting means.

2. In a thermostatic meter comprising a case, liquid measuring means in said case, means in the case for adjusting the displacement of said measuring means, a thermostat mounted in the case and connected to actuate said adjusting means and manually operable means disposed externally of said case and connected to actuate the adjusting means independently of said thermostat to compensate for the cubic expansion properties of the liquid being measured.

3. In a thermostatic meter comprising a case, liquid measuring means in said case, means in the case for adjusting the displacement of said measuring means, a thermostat mounted in the case, a pivoted beam, means connecting it at one end to the thermostat and at the other end to said adjusting means, and means accessible externally of said case for adjusting the connecting means between the beam and the displacement adjusting means for calibrating said meter.

4. In a thermostatic meter comprising a case, liquid measuring means in said case, means in the case for adjusting the displacement of said measuring means, a thermostat mounted in the case, a pivoted beam, means connecting said beam at one end to the thermostat and at the other end to said adjusting means, and means accessible externally of said case for adjusting the connection between the beam and the displacement adjusting means for calibrating the meter, said connection adjusting means comprising an extensible coupling.

5. In a thermostatic meter comprising a fixed member, a track on said member, a fulcrum movably mounted on said track, an adjusting device for said fulcrum, a beam on said fulcrum and having an adjustable end connection, a housing for said meter comprising a removable bowl, said fulcrum adjusting device and said adjustable end connection being enclosed by said bowl, manually operable elements mounted on said bowl and separable connections between one of said elements and said fulcrum adjusting device and between said other element and the adjustable end connection.

6. In a thermostatic meter, displacement controlling means, a thermostat, a fulcrum, a beam mounted on said fulcrum and connecting means connecting it at one end to said displacement controlling means and at the other end to said thermostat, one of said connecting means comprising a slotted plug pivotally mounted in said beam and adapted to threadedly receive a rod disposed substantially perpendicularly to the plane of said slot, said slot having three open sides forming two corners and being closed at one corner after adjustment of the rod is effected to maintain said adjustment.

7. In a thermostatic meter, the combination of a housing comprising a bowl, thermostatic displacement adjustment means mounted inside said housing but independent of the bowl, means for setting said adjustment means comprising a shaft, an indicator on the shaft, a support for the shaft, means for mounting said support on said bowl, indicator scales on said support, and a door for enclosing said indicator, scales and shaft, said door, scales, shaft and said support being demountable as a unit from bowl.

8. In a thermostatic meter, the combination of a housing comprising a bowl, thermostatic displacement adjustment means mounted inside said housing but independent of the bowl, means for setting said adjustment means comprising a shaft, an indicator on the shaft, a support for the shaft, means for mounting said support on said bowl, indicator scales on said support, said scales, shaft and support being demountable as a unit from said bowl.

CLEMENT P. GRIFFITH.
JOHN J. DELANEY.